(12) United States Patent
Xu

(10) Patent No.: US 9,102,071 B2
(45) Date of Patent: Aug. 11, 2015

(54) RAZOR BLADE TECHNOLOGY

(75) Inventor: Yiming Xu, Milford, CT (US)

(73) Assignee: Eveready Battery Company, Inc, St. Louis, MO (US)

( * ) Notice: Subject to any disclaimer, the term of this patent is extended or adjusted under 35 U.S.C. 154(b) by 100 days.

(21) Appl. No.: 13/920,449

(22) PCT Filed: Dec. 7, 2011

(86) PCT No.: PCT/US2011/063694
§ 371 (c)(1),
(2), (4) Date: Sep. 17, 2013

(87) PCT Pub. No.: WO2012/094092
PCT Pub. Date: Jul. 12, 2012

(65) Prior Publication Data
US 2014/0000081 A1    Jan. 2, 2014

Related U.S. Application Data

(60) Provisional application No. 61/430,290, filed on Jan. 6, 2011.

(51) Int. Cl.
| | | |
|---|---|---|
| *B26B 21/40* | (2006.01) | |
| *B26B 21/56* | (2006.01) | |
| *B26B 21/58* | (2006.01) | |
| *B23P 15/40* | (2006.01) | |

(52) U.S. Cl.
CPC .......... *B26B 21/4068* (2013.01); *B23P 15/403* (2013.01); *B26B 21/565* (2013.01); *B26B 21/58* (2013.01); *Y10T 29/4981* (2015.01)

(58) Field of Classification Search
CPC ............................... B26B 21/52; B26B 21/54
USPC .................................. 29/428, 700; 30/346.54
See application file for complete search history.

(56) References Cited

U.S. PATENT DOCUMENTS

| | | |
|---|---|---|
| 5,275,672 A | 1/1994 | Althaus et al. |
| 5,433,801 A | 7/1995 | Althaus et al. |
| 6,629,475 B1 | 10/2003 | Neamtu et al. |
| 7,131,202 B2 | 11/2006 | Pennell et al. |
| 7,531,052 B2 | 5/2009 | Yoshiyama |
| 7,802,353 B2 | 9/2010 | Gratsias et al. |
| 2004/0221460 A1 | 11/2004 | Neamtu et al. |
| 2006/0000526 A1 | 1/2006 | Yoshiyama |
| 2007/0137050 A1 | 6/2007 | Xu et al. |

FOREIGN PATENT DOCUMENTS

| | | |
|---|---|---|
| EP | 1739199 A | 1/2007 |
| EP | 2203282 B | 11/2011 |
| WO | 2009/058437 A | 5/2009 |

OTHER PUBLICATIONS

International Search report of WO2012/094092, Published on Jul. 12, 2012.

*Primary Examiner* — Moshe Wilensky
(74) *Attorney, Agent, or Firm* — Edgewell PersonalCare

(57) ABSTRACT

An elongated flat strip of martensitic stainless steel material for use in manufacturing razor blades is provided with an elongated weakened portion. The weakened portion is provided after hardening, sharpening and cutting edge coating processes are performed. The weakened portion is provided by the application of laser energy that forms a groove along a side of the razor blade and converts previously tempered martensite to untempered martensite in the weakened portion. The razor blade is attached to a support and removed at the weakened portion. The weakened portion can be provided before or after the razor blade is attached to the support.

7 Claims, 4 Drawing Sheets

RAZOR BLADE TECHNOLOGY

CROSS REFERENCE TO RELATED APPLICATIONS

This application claims the benefit of International Application PCT/US2011/063694, filed Dec. 7, 2011 which claims the benefit of U.S. provisional patent application Ser. No. 61/430,290, filed Jan. 6, 2011, the contents of both are incorporated herein for reference in their entirety.

BACKGROUND

1. Technical Field

This disclosure relates generally to manufacturing processes for razor blades, and more specifically to methods of imparting a weakened area to razor blades.

2. Background

Many modern safety razors include a disposable razor cartridge adapted to be selectively connected to a reusable handle by connecting structure therebetween. The cartridge includes a housing having at least one razor blade with a sharpened cutting edge disposed therein. Other modern safety razors include a razor cartridge permanently connected to the handle that can be disposed of as a single unit.

Razor blades are typically made from a continuous strip of stock material that is hardened and subsequently sharpened while the strip travels along a processing line. The strip is then divided into discrete blade length sections used in manufacture of individual cartridges.

In some applications, blades are supported on respective bent supports that are mounted in the cartridge housing. To enable the supported blades to move up and down within the housing during shaving and/or to provide efficient rinsing of shaving debris from between adjacent supported blades it is desirous that the blades have a small width dimension defined perpendicular to the cutting edge. In U.S. Pat. No. 7,131,202 the desirability of a razor blade having a width dimension less than 0.85 mm is disclosed.

In U.S. Pat. No. 6,629,475, a razor blade having a removable portion is provided to facilitate efficient handling, processing and attachment of the razor blade to its support. The removable portion and razor blade are connected at a weakened portion provided to allow the removable portion to be easily removed after the razor blade has been attached to its support. The '475 patent discloses a method of using rolling apparatus to provide the weakened portion. The deforming process is performed to continuous strip material before the strip is cut into discrete blade sections and according to FIG. 5 therein at least before the cutting edge is provided.

In U.S. Pat. No. 7,531,052, apparatus is disclosed to provide a weakened portion for a razor blade using thermal energy, preferably by a laser, to provide an elongated groove in one side of a continuous strip of material. The thermal grooving process is performed to the strip while it is in an as-provided annealed state, i.e. prior to any hardening process and subsequent sharpening process.

In European Patent EP 2203282 B1 a bending process performed to stock material causes inter-granular cleavage. Exposed grain boundaries are oxidized during a subsequent hardening process.

In the three documents mentioned immediately preceding, the respective processes to provide a weakened area are performed to material in continuous strip form and prior to any sharpening process.

SUMMARY

The present disclosure has for its objective to eliminate, or at least substantially alleviate the limitations of the prior art manufacturing processes for razor blades. The disclosure is directed particularly to a method of manufacturing a cutting edge portion of a razor blade attached to a support. The method comprises the steps of:

a) providing a discrete razor blade comprising martensitic stainless steel. The razor blade has a first side, a sharpened cutting edge with optional coatings on the cutting edge, a back edge and a hardness at least 600 HV.

b) providing a groove in the first side along a length of the razor blade by an application of laser energy to provide a weakened portion;

c) attaching the razor blade to a support;

d) removing a portion of the razor blade extending between the back edge and the weakened portion to result in a cutting edge portion of the razor blade attached to the support, wherein the cutting edge portion extends from the cutting edge to the weakened portion.

In some embodiments the step of attaching the razor blade to a support can be performed before the step of providing a groove along a length of the razor blade. In some embodiments the weakened portion includes untempered martensite. In some embodiments the groove is provided at a linear speed about 200 to about 300 mm/s. In some embodiments the groove has a width about 0.035 to about 0.050 mm. In some embodiments a proportion of retained austenite in the weakened portion is greater than the proportion of retained austenite of the discrete razor blade as-provided.

Embodiments of the disclosure have the following advantages. The process to provide the weakened portion is performed after the sharpening process. The strip material being sharpened therein is more robust and permits the manufacture of a razor blade attached to a support wherein the razor blade has a desirably small width dimension. The force and deflection required in apparatus to remove the portion between the weakened portion and the back edge is reduced in comparison the forces and deflections for other methods resulting in longer life for this apparatus.

The above features and advantages of the present disclosure will be more fully understood with reference to the following detailed description when taken in conjunction with the accompanying drawings.

DETAILED DESCRIPTION

Figure 1:
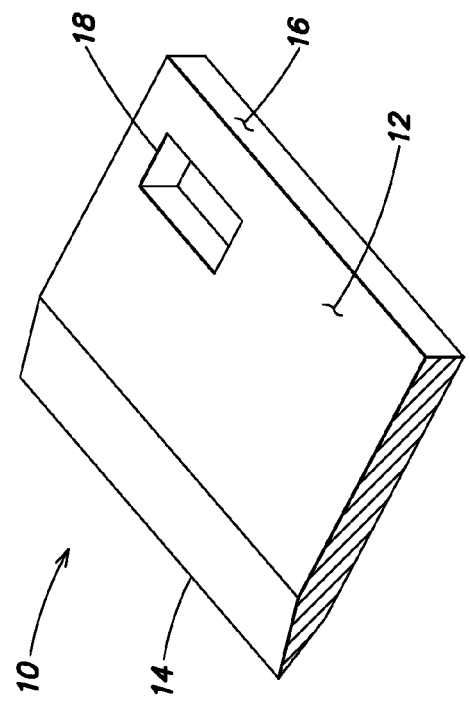
FIG. 1 is a sectioned perspective view of a discrete razor blade.

Referring now to the drawings and in particular to FIG. 1, a discrete razor blade 10 has a first side 12, a cutting edge 14 and a back edge 16. The razor blade can be provided with one or more apertures 18 that can assist location and feeding of the razor blade throughout its many manufacturing process steps from its form as continuous strip up to final assembly.

The razor blade comprises a martensitic stainless steel and has a composition preferably 0.65-0.72% C; 12.7-13.9% Cr; 0.45-0.75% Mn; 0.15-0.5% Si; 0-0.5% Ni; 0-0.02% S; 0-0.025% P; balance substantially Fe. The present disclosure is not limited to strip of the aforementioned hardness and composition and other martensitic stainless steel materials including those disclosed for example in U.S. Pat. Nos. 5,275,672 and 5,433,801 both to Althaus et al.; U.S. Patent application publication 2007/0,137,050 to Xu et al. and European Patent application EP 1,739,199 A1 to Millward may be employed. The many manufacturing processes required to convert continuous (annealed) flat strip material to discrete razor blades can include a hardening step to effect a martensitic transformation to the strip whereby the hardness is increased from about 280-320 HV or more in its as-received state to about 750-850 HV and with the strip having about 10-20% retained austenite (RA). The retained austenite provides ductility for the strip during subsequent processing steps, e.g. resistance to compressive stresses during sharpening, and also provides durability for the cutting edge of the blade during use. In the hardening process the strip is heated to about 1100° C., typically in a muffle furnace, rapidly quenched to about –45 C. to –70° C. to achieve a martensitic transformation and then tempered at about 150° C. to temper the martensite. The strip is sharpened to provide a cutting edge. The many manufacturing processes can include processes to provide coatings on the cutting edge, for example an undercoat layer of chromium, titanium, platinum or niobium, a subsequent layer of hard material, e.g. a hard carbon material such as diamond-like carbon (DLC) or amorphous diamond (a-D) and an outer layer of a low-friction material such as polytetrafluoroethylene (PTFE). The process step to sinter (i.e. to melt and adhere) the PTFE to its substrate can be performed over a finite duration at a temperature (typically up to about 360° C.) that causes the material of the razor blade to soften to about 620-640 HV and where the martensite is further tempered.

Figure 2:
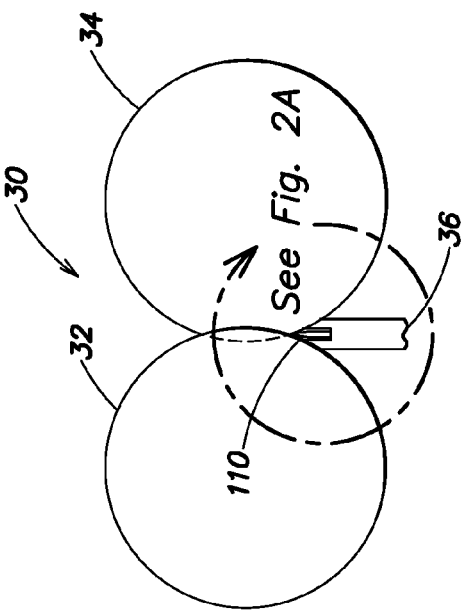
FIG. 2 is a schematic end view of sharpening apparatus.
Figure 2A:
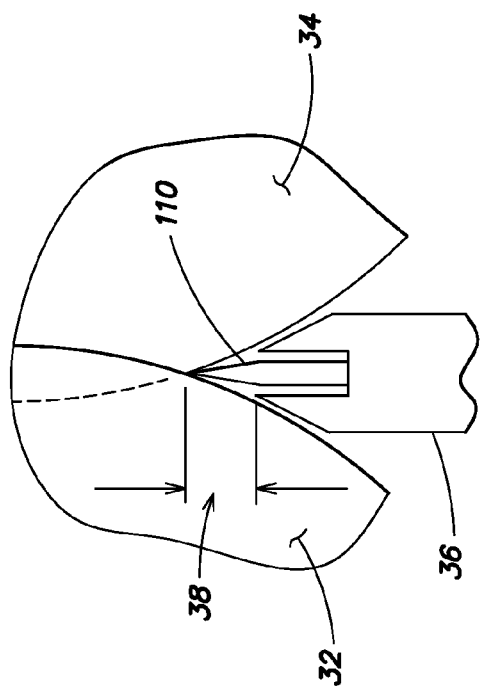
FIG. 2A is an enlarged portion of FIG. 2.

In FIGS. 2 and 2A schematic end views of sharpening apparatus 30 to provide the cutting edge are depicted. A set of counter-rotating and interlocked (also known as intermeshed) grinding wheels 32, 34 perform material removal while the strip for the razor blade 110 is supported and located in guide 36 as it travels between the wheels in a direction perpendicular to the plane of the figure. Typically, some wheels can rotate at about 3000 rpm while the strip can travel between them at about 40 m/min or more. Typically the grinding wheels have respective left- and right-handed spiral grooves to provide the interlocking relationship as the wheels counter-rotate. The wheels can also be formed with a series of spaced circumferential grooves. Typically several sets of wheels are provided, each set having a sequentially finer grit size, to achieve a desired cutting edge profile and surface finish. As can be seen in FIG. 2A, the geometry of this arrangement is such that a portion of the strip 38 extends beyond the guide. This portion can have a dimension up to about 1.8 mm, depending on the geometry of the specific arrangement used, e.g. a local external diameter of the grinding wheel. As the strip passes between the wheels, any point on the cutting edge is only contacted by one wheel at any one time due to the interlocked nature, but the wheel contact alternates side to side on the strip as the wheels rotate and/or this point on the strip travels between the wheels. This results in alternating forces being applied to this point of the cutting edge from contact pressure of the respective grinding wheels. This effect can be integrated along the length of the strip resulting in a pattern of relatively high speed alternating forces as a result of the strip travel speed and rotational wheel speed. Any process to provide a weakened portion to the strip prior to the sharpening process where that weakened portion is within a portion of the strip extending beyond the guide can thus be undesirable. Premature or full or partial failure of the strip can occur by fatigue and/or bending stresses at the weakened portion.

Figure 3:
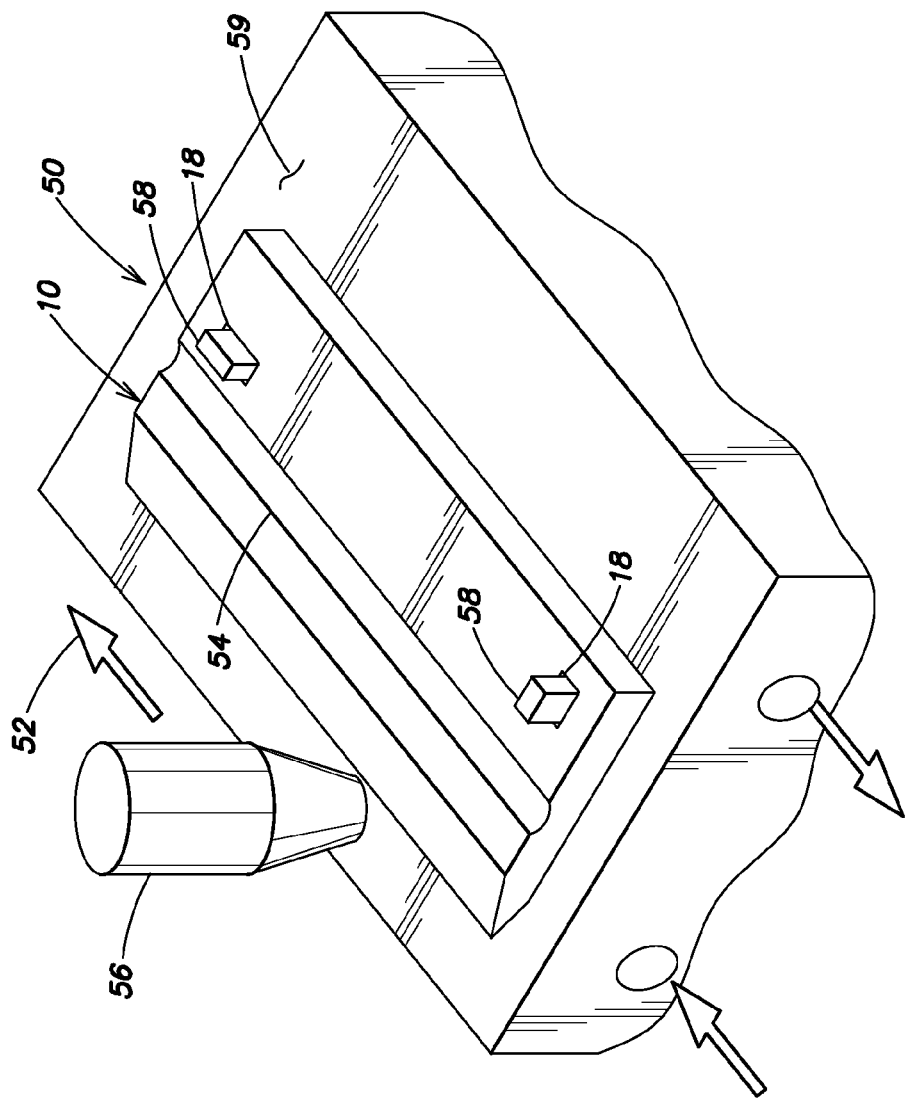
FIG. 3 is a schematic perspective view of an embodiment of a weakening process.

Referring now to schematic FIG. 3, equipment 50 to perform a localized weakening process to a discrete razor blade 10 is depicted. The razor blade is located in the equipment e.g. by location pins 58 passing into apertures 18 of the razor blade and in contact with or preferably clamped to thermally conductive, preferably cold-water chilled surface 59. A laser energy emitting device 56 is moved along the razor blade in a direction 52 preferably parallel to the cutting edge to result in a groove 54 in the first side 12 after the operation is complete. Subsequent cooling is achieved in part by conduction to the chilled surface 59 and radiation from the first surface. A suitable laser emitting device is a model LMF5000 fiber laser marking system provided by UNITEK MIYACHI. Suitable operating parameters for this device include operating power 40% (of peak power 50 W); frequency 100-300 kHz; laser spot size in the range 0.035 to 0.050 mm; linear speed along the razor blade in the range 200 to 400 mm/s; depths of groove in the ranges 5-10 microns, 20-25 microns and 23-38 microns.

Figure 4:
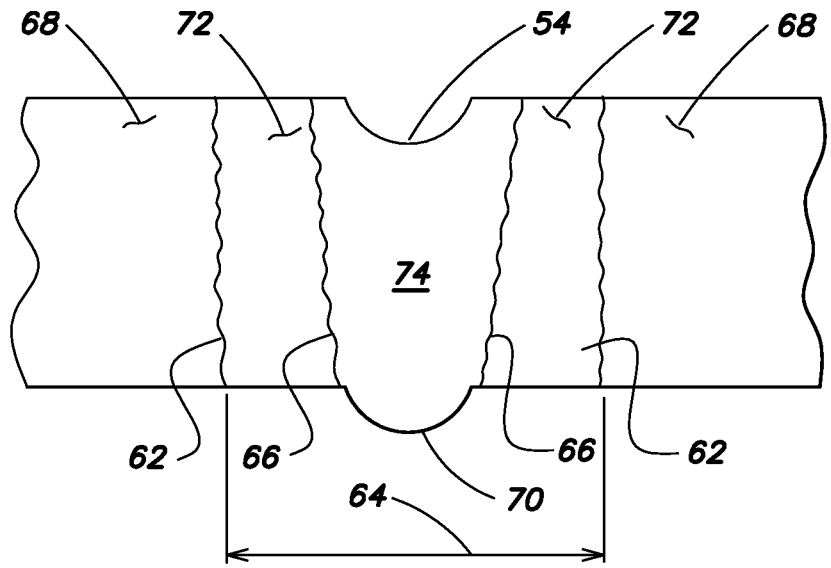
FIG. 4 is a schematic enlarged cross section of a weakened portion.

In FIG. 4 a schematic enlarged cross section of a weakened portion thus provided is depicted. As the application of laser energy as described above is very rapid and the heat thus generated conducted away quickly the heat-affected zone 64 is narrow and clearly defined by boundaries 62 which will be seen in a photomicrograph of the region. Adjacent regions of the razor blade material 68 essentially retain their characteristics as described above. As heat generated by the laser energy is conducted away, e.g. through the water chilled surface 59 at a rate lower than the rapid quench step of the hardening process the retained austenite (RA) in regions 72 is higher than in regions 68, for example regions 68 can have less than 10-20% RA whereas regions 72 can have about 30% RA. In a photomicrograph, ordered and defined lines of carbides 66 will be seen between regions 72 and a central region 74 of even higher RA. The previously tempered martensite of the central region is converted to untempered martensite. Although the RA level of the central region 74 is elevated, the effect of the untempered martensite and the groove effectively provides a weakened portion where the razor blade will fracture upon the application of a mechanical force. During the formation of groove 54, molten material can erupt from the opposed outer surface resulting in protrusion 70. Preferably any such protrusion is minimized such that it will not negatively affect subsequent process steps of the razor blade, e.g. assembly to any support.

Figure 5:
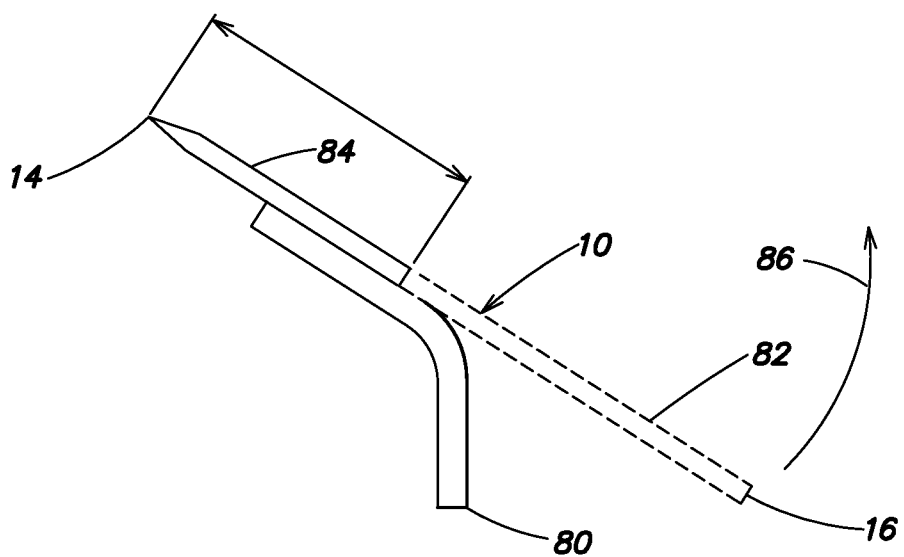
FIG. 5 is an end view of a cutting edge portion of a razor blade attached to a support.

In FIG. 5, razor blade 10 including the laser applied weakened portion is attached to a support 80, e.g. a generally L-shaped support. Attachment can be by e.g. (laser) spot welding or by application of a suitable adhesive. Application of a mechanical force in the region of the back edge in the approximate direction 86 causes the razor blade to fracture in the weakened portion resulting in a cutting edge portion of the razor blade extending from the cutting edge to the weakened portion 84 being attached to the support and removing a portion of the razor blade extending between the back edge and the weakened portion (shown dashed) 82.

Figure 6:
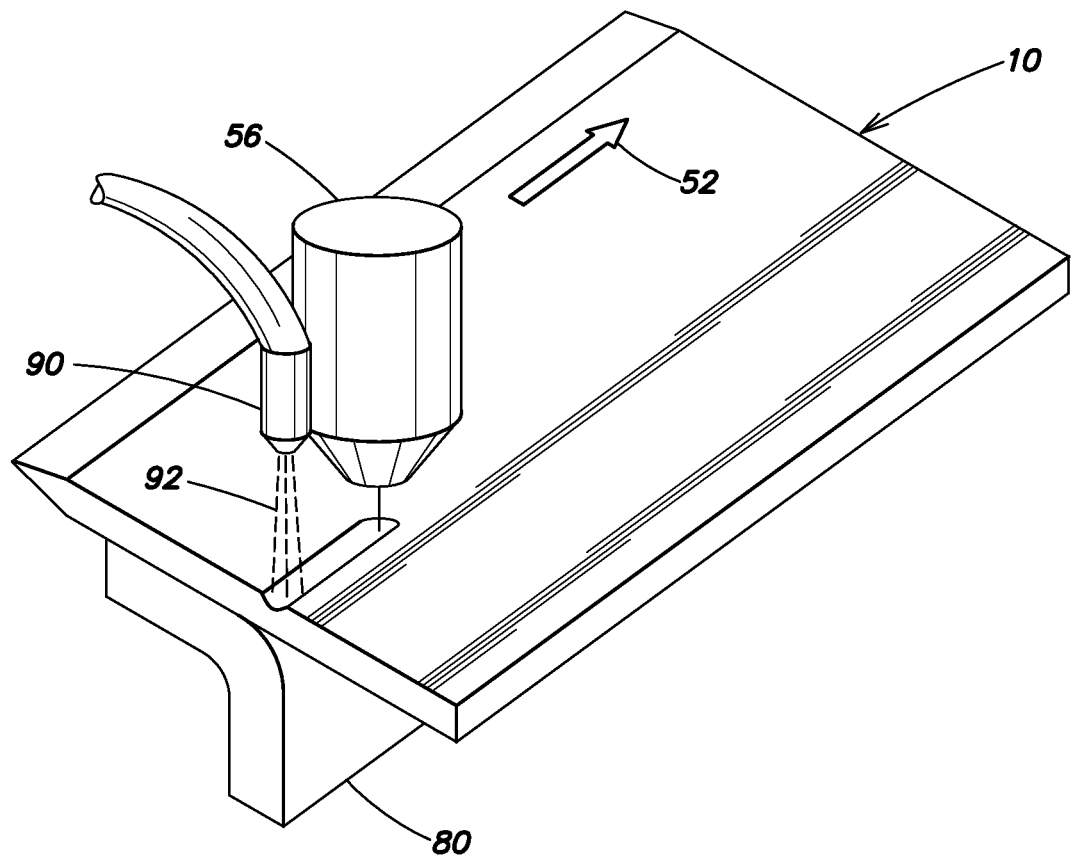
FIG. 6 is a schematic perspective view of another embodiment of a razor blade attached to a support and another weakening process.

In other embodiments the razor blade can be attached to the support prior to the application of laser energy to provide a weakened portion, and subsequent removal of razor blade portion 82. In this embodiment the razor blade can be permitted to air-cool after application of laser energy or is preferably cooled by blowing chilled air or other suitable gasses on the razor blade, e.g. on the first side 12. This is depicted in FIG. 6. Razor blade 10 is attached to support 80. Laser energy emitting device 56 is moved along the strip in direction 52 as previously described and is depicted in an arbitrary mid-position along the razor blade. Chilled air or gas 92 emitting nozzle 90 follows the laser emitting device.

Although the disclosure has been described and illustrated with reference to specific illustrative embodiments thereof, it is not intended that the disclosure be limited to those illustrative embodiments. Those skilled in the art will recognize that variations and modifications can be made without departing from the true scope of the disclosure as defined by the claims that follow. For instance, features disclosed in connection with any one embodiment can be used alone or in combination with each feature of the respective other embodiments.

What is claimed is:

1. A method of manufacturing a cutting edge portion of a discrete razor blade attached to a support, comprising the steps of:
    a) providing a discrete razor blade comprising tempered martensitic stainless steel, the discrete razor blade having a first side, a sharpened cutting edge, a back edge and a hardness at least 600 HV;
    b) providing a groove in the first side along a length of the discrete razor blade by an application of laser energy to provide a weakened portion;
    c) attaching the discrete razor blade to a support;
    d) removing a portion of the discrete razor blade extending between the back edge and the weakened portion to result in a cutting edge portion of the discrete razor blade attached to the support, wherein the cutting edge portion extends from the cutting edge to the weakened portion;
    wherein step c) is performed one of before and after step b); and
    wherein the weakened portion includes untempered martensite.

2. The method of claim 1, wherein, when step c) is performed before step b), the first side is cooled by an application of chilled gas after the application of laser energy.

3. The method of claim 2, wherein the gas is air.

4. The method of claim 1, wherein, when step c) is performed after step b), cooling of the discrete razor blade includes conduction to a chilled surface.

5. The method of claim 1, wherein the application of laser energy is performed at a linear speed in a range about 200 to about 300 mm per second.

6. The method of claim 1, wherein the groove has a width in the range about 0.035 to about 0.050 mm.

7. The method of claim 1, wherein a proportion of retained austenite in the weakened portion is greater than a proportion of retained austenite of the discrete razor blade of step a).

* * * * *